Sept. 8, 1970  H. W. HOLY  3,527,926
COMPUTING SYSTEM FOR PROCESSING CHARTED CHROMATOGRAPHY CURVES
Filed Sept. 20, 1965  3 Sheets-Sheet 2

INVENTOR
Harold W. Holy
BY
Harry Cohen
ATTORNEY

INVENTOR
Harold W. Holy
BY
ATTORNEY

United States Patent Office

3,527,926
Patented Sept. 8, 1970

3,527,926
COMPUTING SYSTEM FOR PROCESSING CHARTED CHROMATOGRAPHY CURVES
Harold W. Holy, Hundon, Sudbury, England, assignor to Technicon Corporation, a corporation of New York
Filed Sept. 20, 1965, Ser. No. 488,682
Claims priority, application Great Britain, Jan. 5, 1965, 483/65
Int. Cl. G01n *31/08;* G06k *11/02*
U.S. Cl. 235—61.6   6 Claims

ABSTRACT OF THE DISCLOSURE

A computing apparatus is provided with a chart on which has been recorded the curve peaks which are the concentrations of respective constituents of a sample which has been chromatographically analyzed. The apparatus is used to follow the respective curve peaks, to integrate the area enveloped by each curve peak and multiply such curve by appropriate factors and to directly indicate the quantity of each unknown constituent.

---

This invention relates to chromatographic analysis, and particularly to a method and apparatus for determining the quantities of unknown constituents in a sample.

In liquid chromatographic analysis, it is customary to initially pass the unknown liquid sample into a chromatographic column and to subsequently pass a buffer or stripper solution into the column to sequentially pass out the constituents. These constituents, which pass out of the column in sequence in the eluent stream are analyzed, as by chemical photometric methods, to determine the quantity of each constituent present. The photometric method provides a vlotage signal which is responsive to the light transmittance of the eluent. Thus, for example, a first portion of the eluent stream may contain a quantity of a first amino acid, a second, subsequent portion of the eluent stream may contain a quantity of a second amino acid. The eluent stream is treated with a reagent, such as ninhydrin, to provide a color reaction with each constituent amino acid, and this reacted stream is passed through a flow cell wherein its light transmittance is continuously measured. The light transmittance is plotted on a strip recorder. Generally, the recorder plots a continuous curve having a plurality of peaks, the area enveloped by each such peak being indicative of the concentration, and, therefore, over an interval of time, the quantity of the respective constituent present. Such apparatus is taught in U.S. Pat. 3,010,-798, issued Nov. 28, 1961 to Edwin C. Whitehead et al., and U.S. Pat. 3,074,784, issued Jan. 22, 1963 to Andres Ferrari, Jr.

In the past, however, it was then necessary to manually measure the area enveloped by each peak, and to relate this area to one or more standards, to determine the actual quantity of the respective constituent present in the eluent stream.

In gas chromatographic analysis, it has been known to pass the eluent stream of gas through a cell which provides a voltage signal which is indicative of the concentration of a particular constituent gas. This voltage signal may be concurrently integrated to provide a signal responsive to the quantity of the constituent gas. Again, this integrated value must be related to one or more standards to determine the actual quantity of the respective constituent. Further, this requires that the integrator be continuously line to a particular chromatographic column.

It is, therefore, an object of this invention to provide a method and apparatus for mechanically converting the concentration signal as recorded by the recorder into a direct reading of the total quantity of constituent in the eluent stream.

It is another object of this invention to provide an apparatus for providing such a direct reading which is "off line," and which may, therefore, sequentially service a plurality of concurrently operated chromatographic columns.

A feature of this invention is the provision of a computing apparatus which receives a chart on which has been recorded the curve peaks which are responsive to the concentrations of the respective constituents, which integrates the area enveloped by each peak, which multiplies each area by the appropriate factors, and directly indicates the quantity of each unknown constituent.

Another feature is a method of operating such an apparatus.

These and other objects, features and advantages of this invention will be apparent upon consideration of the following specification taken in conjunction with the accompanying drawing, in which FIG. 1 shows one peak in a curve provided by the recorder associated with a chromatographic column;

Figure 1:
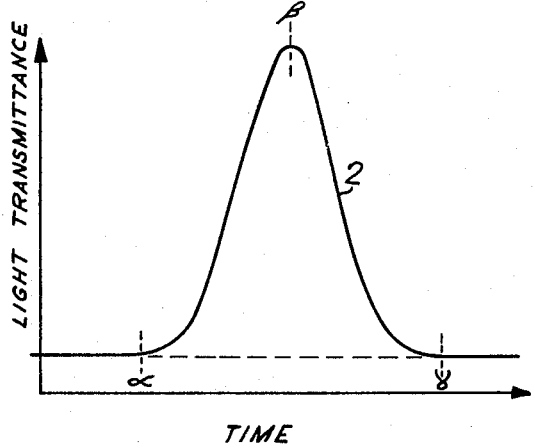
Figure 2:
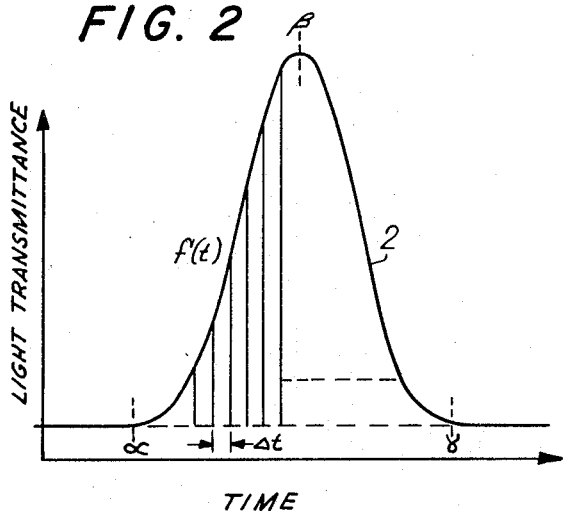
FIG. 2 shows the integration of the curve envelope of FIG. 1.

As each constituent, such as an amino acid, is eluated as a stream from a chromatographic column and is passed through the automatic analysis apparatus, as taught in U.S. 3,010,798 and U.S. 3,074,784, supra, the recorder traces a curve peak 2 as shown in FIG. 1. The amplitude of the curve is proportional to the concentration of the constituent in the stream, and the area under the curve $\alpha\beta\gamma$ is proportional to the total quantity of the constituent in the stream. Where $g_1=$the total quantity of the amino acid represented by the curve peak; $k_1=$a constant distinctive for the particular amino acid of interest, and different for each amino acid; $A_1=$the area of the curve peak; and the subscript 1 refers to the particular amino acid of interest; then:

$$g_1 = K_1 A_1 \qquad (1)$$

The constant $K_1$ is found by previously measuring the area $A_{S1}$ of a known, standard amount of the particular amino acid of interest.

Hence, the unknown quantity of the particular amino acid of interest is given as a ratio:

$$q_1 = \left[\frac{k_1 A_1}{k_1 A_{s1}}\right] g_{s1} = \frac{A_1 g_{s1}}{A_{s1}} \quad (2)$$

The known, standard amount of the amino acid is commonly run at rare intervals, together with the other standard amounts of amino acids commonly encountered, in what is called a "Standardizing Run."

If the amplitude of the curve peak $\alpha\beta\gamma$ at any point is $\delta(t)_x$ and the peak is divided into equal sections $\Delta t$ are chosen small enough, the area of each $\Delta t$ will approximate $f(t)_x \Delta t$. The total area will be the sum of all of the $f(t)_x \Delta t$ sections between $\alpha$ and $\gamma$.

If a stylus is moved along the curve peak, and in so doing generates a voltage E which is directly and linearly proportional to $f(t)_x$, that is:

$$f(t)_x = a E_x$$

where $a$ is a constant, then the area of the curve peak is the sum of all $\Delta t$ sections between $\alpha$ and $\gamma$ or:

$$A_1 = \sum_{\gamma}^{\alpha} a E_x \Delta t \quad (3)$$

Figure 3:
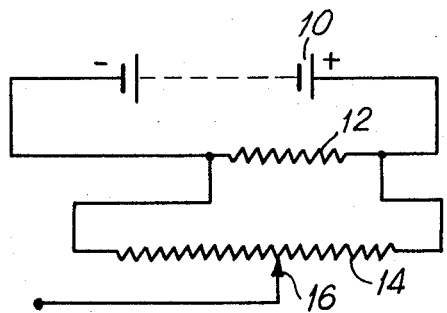
FIG. 3 is an electrical schematic diagram illustrating the principle for obtaining a voltage signal which is responsive to the amplitude of the recorded curve.

As shown in FIG. 3, a battery or low internal impedance source 10 supplies a current to a resistance 12, to provide a voltage drop across a slidewire 14. The slidewire is adjusted or linearized in resistance so that it transforms the complex expression in $t$, that is, provides a linear response such that:

$$f(t)_x = aE$$

Combining Equations 2 and 3 yields:

$$q_1 = \frac{A_1}{A_{s1}} g_{s1} = \frac{\sum_{\gamma}^{\alpha} a(E_x \Delta t)_1}{\sum_{\gamma}^{\alpha} a(E_x \Delta t)_{s1}} \cdot g_{s1} = \frac{\sum_{\gamma}^{\alpha} (E_x \Delta t)_1}{\sum_{\gamma}^{\alpha} (E_x \Delta t)} \cdot g_{s1}$$

The total area of the curve peak requires the summing of all the increments $\Delta t$. If the curve peak is moved at a fixed rate with respect to the line coordinate past a fixed stylus, then the total time to traverse the total width of the curve peak will be proportional to the width of the curve, or:

$$\Sigma \Delta t = \alpha t$$

where $\alpha$ is a constant.

If this stylus is coupled to the sliding tap 16 of the slidewire 14, then the tracing with the stylus of the amplitude of the moving curve will give a varying voltage for a total time $t$. If this varying voltage is coupled to a motor whose revolutions per minute are strictly proportional to this applied voltage $E_x$ at each moment $\Delta t$, and the total revolutions of this motor are shown by a counter, then this counter will give the sum of all products:

$$\sum_{\gamma}^{\alpha} E_x \Delta t$$

or the area of the curve peak. Such a motor-counter combination is called an integrating motor.

In amino acid analysis, the ratio of areas is of interest, therefore, the constants of proportionality cancel out, and the number indicated by the counter of the integrator motor is sufficient.

In practice, the value of $k_2$ in Equations 1 and 2 may vary from time to time, which is to say, the sensitivity of the system may change. In such a case these equations must be written as:

$$q_1 = \frac{K_1}{K_{s1}} \cdot \frac{A_1}{A_{s1}} q_{s1} \quad (2a)$$

The ratio $K_1/K_{s1}$ is unknown, and must be measured. This is accomplished by means of an internal standard. An amino acid, or amino-acid-like substance, is chosen as the internal standard which would not normally appear in the mixture of amino acids being analyzed, for example, norleucine. The same quantity of the internal standard is added to all mixtures which are analyzed, both unknown runs and standardizing runs. On each run the area of the curve peak generated by this internal standard is measured. $q'$, $K'$, $K'_s$, $A'$, $A_{s'}$ are the first sample amino acids. $q'$, $K'$, $A'$ and $A_s$ refer to the internal standard. As a result of a standardizing run and an unknown run, from Equation 2a results:

$$q^1 = \frac{K^1}{K^1_s} \cdot \frac{A^1}{A^1_s} \cdot q^1_s$$

but $q' = qs'$; from whence:

$$\frac{K^1}{K^1_s} = \frac{A^1_s}{A^1_1} \quad (4)$$

It is assumed that even though $K'$ may differ for each amino acid, the ratio is the same for all, i.e., the percentage change between the standardizing and unknown runs is the same. Substituting Equation 4 into 2a gives:

$$q_1 = \frac{A_1}{A_{s1}} \frac{A^1_s}{A^1} q_{s1} \quad (5)$$

It will be recalled that those areas with the subscript S has been done during a standardizing run, and those without the subscript S have been done during an unknown run. Since a standardizing run is done only occasionally, it is convenient to rearrange Equation 5 as:

$$q_1 = \frac{A_1}{A^1} \frac{A_s}{A_{s1}} q_{s1}$$

If the ratio $A'_s/A_{s1}$ is computed for each amino acid respectively during a standardizing run, it may be used respectively for all subsequent unknown runs. This ratio for each respective amino acid is called its "color equivalent."

This, the total quantity of a particular amino acid in an unknown run is equal to the ratio of the area of the particular amino acid from the unknown run to the area of the internal standard from the unknown run, multiplied by the color equivalent of the particular unknown amino acid.

Figure 4:
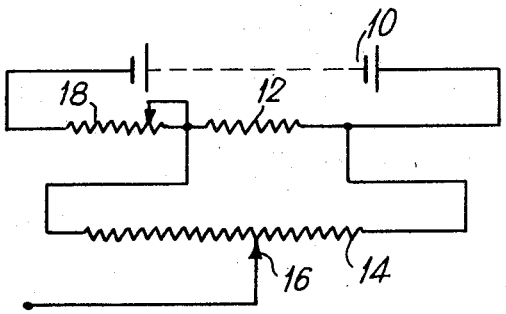
FIG. 4 is an electrical schematic diagram illustrating the principle for dividing the signal of FIG. 3 by a factor.

As shown in FIG. 4, the potential across the slidewire 14 is proportional to the current through the resistor 12. If the current source 10 is of very low internal impedance and of a relatively high variable resistance 18 is connected in series with the resistor 12, then the current through the resistor 12 depends approximately on the value of the high resistor 18, and so also depends the potential across the slidewire 14. If the resistance of the resistor 18 is doubled, the potential across the slidewire is halved, and the total count given by the integrating motor will be halved. Thus, the resistor 18 serves as a means to divide the output at tap 16 by a desired factor.

For example, the area of the internal standard is traced during a standardizing run with the variable resistor 18 set to .1 of its total resistance and the count of 387 is indicated. The resistor 12 is divided into 1000 even parts and so numbered. The resistance of the resistor 18 is set at $387/1000$ so that the current through the resistor 12 will be $1/3.87$ of the current when the standard curve was traced, and the count of 100 will be indicated.

It is usual practice to use 1.0, 0.1, 0.01 micro-mole for $g_{s1'}$ and so no further multiplication is required. If, however, 2.0 micro-moles were used, then resistor 18 would be set at .2 of its maximum.

Occasionally, if an amino acid is of such a type that it has a very low color equivalent, then it is necessary to multiply its response. This may be accomplished by doubling or trebling the potential across the slidewire 14 by doubling or trebling the resistance of the resistor 12.

Figure 5:
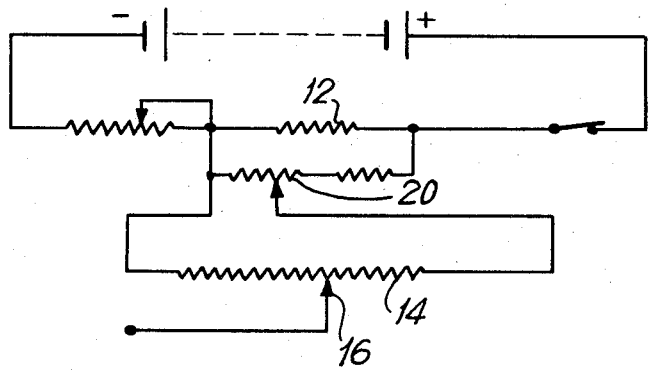
FIG. 5 is an electrical schematic diagram illustrating the principle for multiplying the signal of FIG. 4 by an additional factor.

The color equivalent varies between 0.80 to 1.20 for most amino acids. As shown in FIG. 5, a variable resistor 20 is coupled in parallel with the resistor 12. The resistance of the resistor 20 is variable, and is adjustable so that if one intermediate setting thereon is considered to give a potential across the slidewire of 1.0, a minimum resistance setting will reduce the potential across the slidewire linearly to 0.80, and a maximum resistance setting will raise the potential across the slidewire to 1.20. Using a variable resistor with 1000 divisions of scale which can be stopped to read from 800 to 1200 gives a direct reading of this color equivalent.

Figure 6:
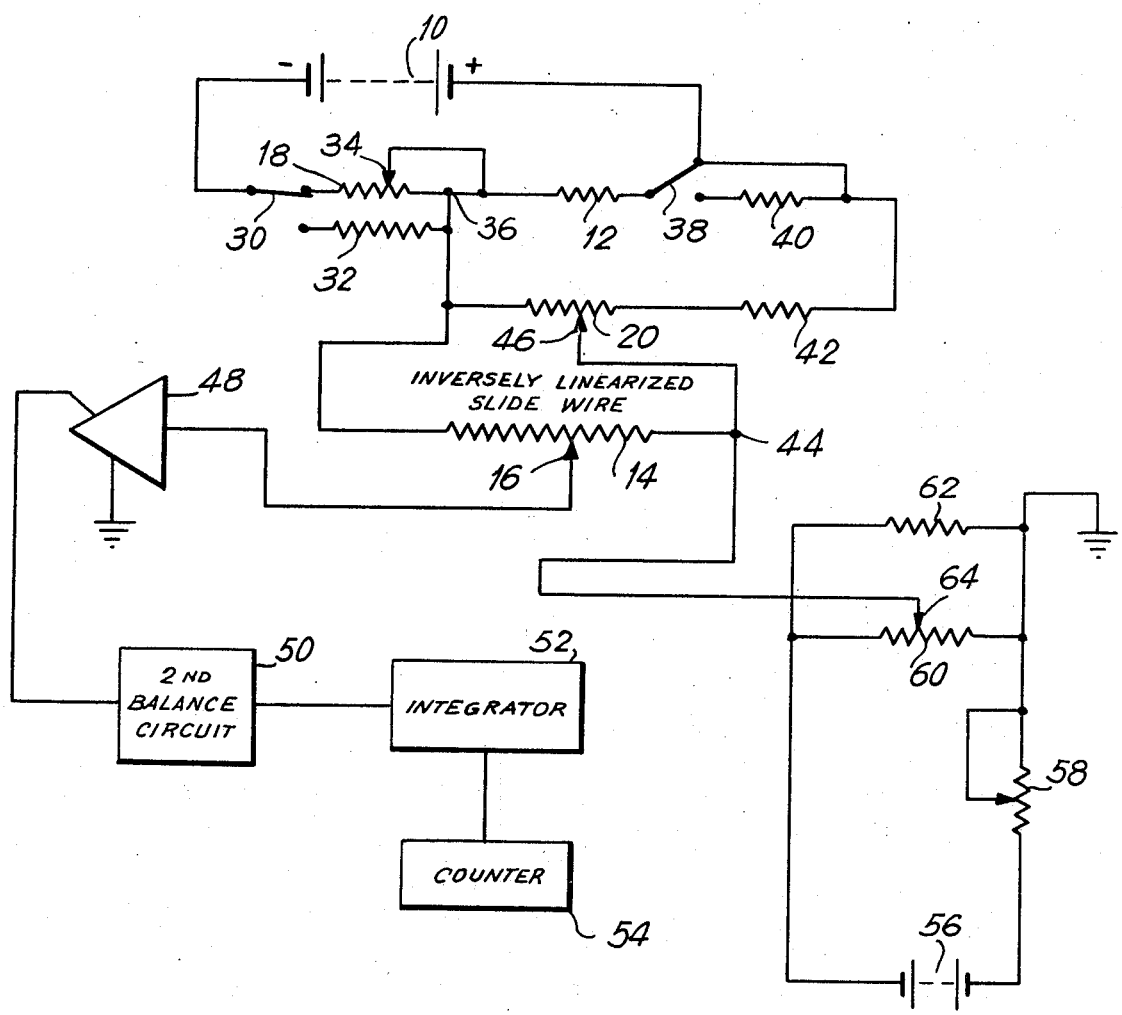
FIG. 6 is an electrical schematic diagram of an embodiment of this invention.

In the complete circuit of a semi-automatic integrator shown in FIG. 6, one terminal of the battery 10 is alternatively coupled by a "standard or area" single pole, double throw switch 30 to either one end of the "standard area" variable resistor 18 (e.g. 5 kilohm, 10 turn Helipot), or one end of a "standard" resistor 32 which has a resistance equal to 0.1 of the maximum resistance of the resistor 18 (e.g. 500Ω ±0.1%). The other end of the resistor 18, the other end of the resistor 32, and the sliding tap 34 of the resistor 18 are connected to a junction 36. The junction 36 is connected to one end of a "standard" resistor 12 (e.g. 10 ohms ±0.1%). The other end of the resistor is alternatively coupled by a "full or half" single pole, double throw switch 38 to either the other terminal of the battery 10 directly, or to one end of "halving standard" resistor 40 whose other end is connected to the other terminal of the battery.

The junction 36 is also connected to one end of a "color equivalent" variable resistor 20 (e.g. 5 kilohm, 10 turn Helipot), whose other end is connected to one end of a fixed resistor 42 (e.g. 5.7 kilohm), and whose other end is connected to the other terminal of the battery.

The junction 36 is also connected to one end of an inversely linearized slidewire 14 whose other end is connected to a junction 44. The junction 44 is connected to the slideable tap 46 of the resistor 20.

The slideable tap 16 of the resistor 14 is connected to the input of a very high gain amplifier 48 with excellent stability, good linear response and low noise. The amplifier is grounded and comprises the first stage of an integrator system which also includes a second zero balancing circuit 50 designed to compensate for any output of the amplifier on zero settings, an integrating motor and generator combination 52, and a counter 54, substantially as shown in the German Pat. 1,051,386, published Feb. 26, 1959. Other known integrating systems may be utilized, which will integrate a variable voltage with respect to a fixed rate of time.

A curve zeroizing control is provided by a battery 56 (e.g. 1½ volts), a rheostat 58 (e.g. 100 kilohms) connected between one terminal of the battery and ground, and a potentiometer 60 (e.g. 5 kilohms) and a resistor 62 (e.g. 11 ohms) connected in parallel between the other terminal of the battery and ground. The movable tap 64 of the potentiometer 60 is connected to the junction 44.

The toggle switch 30 serves to alternatively couple either the fixed resistor 32 into the circuit for the measurement of the standard curve, or the potentiometer 18 into the circuit for the measurement of the unknown curve. The toggle switch 38 serves to alternatively couple either the resistor 12, or both resistor 12 and the resistor 40 across the slidewire 14 to provide the system with either normal or double sensitivity. The potentiometer 18, as previously described, serves to divide the output potential at 46 by an adjustable factor and is used as the standard area ratio control. The potentiometer 20, as previously described, serves to multiply the output potential at 46 by an adjustable factor and is used as the color equivalent ratio control. The potentiometer 60 serves to subtract an adjustable potential from the potential at 46, and is used to zeroize the curve on the chart if it is above the baseline.

Figure 7:
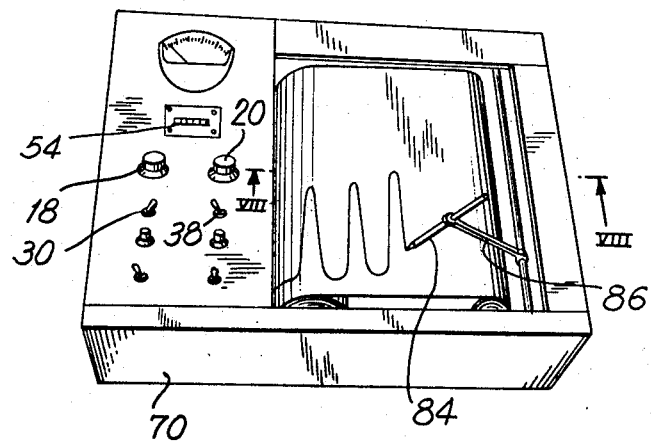
FIG. 7 is a perspective view of the embodiment of FIG. 6.
Figure 8:
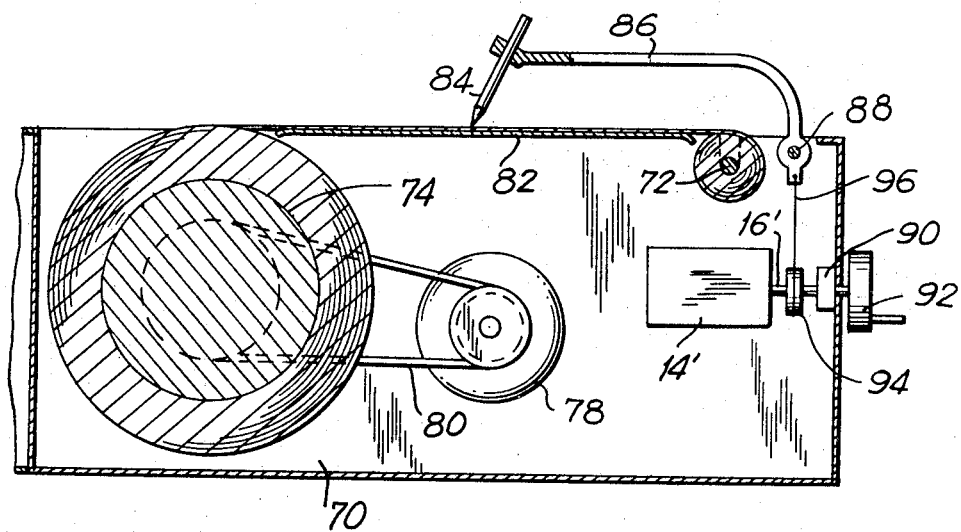
FIG. 8 is a front view in elevation taken along plane VIII—VIII of FIG. 7.

The circuit in FIG. 6 is mechanized as shown in FIGS. 7 and 8. The apparatus includes a housing 70 having a first roller 72, and a second roller 74, journaled therein in parallel. The roller 72 is idle but braked, while the roller 74 is driven by a constant speed motor 78 coupled thereto by a belt 80 and pulley system. A top plate 82 is supported by the housing. The roll of chart paper is mounted on the roller 72, passes over the plate 82, and is wound up on the roller 74 at a constant rate by the motor 78, along a longitudinal axis.

A stylus 84 is mounted in a carrier 86, which is slideable along a lateral axis on a guide rod 88 which is fixed in the housing parallel to the rollers 72 and 74. A potentiometer 14' is fixed within the housing and has its moveable tape coupled to a shaft 16' which is passed through the housing by a journal 90. The exterior end of the shaft is fixed to a crank handle 92. A pulley 94 is fixed to the shaft 16' within the housing and coupled to the carrier 86 by a belt drive 96 which passes around the pulley 94 and is fixed to the carrier 86. Thus, lateral movement of the carrier causes rotation of the shaft 16' and vice-versa. The stylus 84 may be traversed laterally either by manually rotating the crank 92 or by manually shifting the carrier 86. As the chart unrolls over the plate 82 at a constant rate, the operator manually causes the stylus to follow each curve peak, rotating the shaft 16' and providing at the movable tape of the potentiometer 14' a voltage which is responsive to the amplitude of the curve peak.

In use, a standard mixture of known quantities of known constituents which it is anticipated will occur in the sample mixture, plus a known quantity of an additional known constituent which it is anticipated will not occur in the sample mixture, are passed through a chromatographic system to produce a standard curve having a plurality of peaks, the area enveloped by each peak being indicative of the quantity of a respective constituent in the standard mixture. This standard curve may be processed further immediately or may be processed with the sample curves run from that chromatographic system. A standard curve may be run and processed for each chromatographic system used.

Each sample mixture of unknown quantities of the known constituents, plus a known quantity of the additional known constituent, is passed through the chromatographic system to produce a sample curve having a plurality of peaks, the area enveloped by each peak being indicative of the quantity of a respective constituent in the sample mixture.

The standard curve chart is rerolled and placed on the roller 72, over the platform 82, onto the roller 74. The color equivalent ratio potentiometer 20 is set at 1.0. The switch 38 is set to couple only the resistor 12 to the battery. The switch 38 is set to couple the standard resistor 32 to the battery. The stylus 84 is placed on the base of the curve or baseline. If the base of the curve is not at the zero, the rheostat 58 and potentiometer 60 are adjusted to zeroize the counter 54. Each standard curve peak is traced intermittently and sequentially by energizing the motor 78 to advance the chart longitudinally under the roller at a constant rate, and by laterally, manually, tracing the peak with the stylus 84. After each peak is traced, the motor 78 is stopped, the count is recorded, and the counter is reset. If all of the quantities were identical, then direct ratios of the areas of the known constituents to the additional known constituent, commonly norleucine, may be found.

The sample curve chart is similarly rerolled, placed on the rollers, the baseline is zeroized, and the curve responsive to the additional known constituent is traced. If the sensitivity of the chromatographic system is identical for both the standard and the sample runs, and the quantities of the additional known constituent in both runs were identical, the areas in both runs should be identical. If the sensitivity changes, the areas will change. The ratio of these areas, called the standard area ratio is now set, once for the rest of this sample run, on the potentiometer 18, and the switch 30 is moved to put this potentiometer 18 in the circuit. The color equivalent ratio for the next sample known constituent to be traced is set on the potentiometer 46 and this peak is traced, the direct indication of the area is recorded and the counter is reset. Each color equivalent ratio is set on, and the respective peak is traced in sequence.

Once a standard run has been made for each chromatographic system to be used, the sample runs from each system may be semi-automatically processed in any order at the operators convenience. One embodiment of this invention may be used to compute the results from any number of systems.

While the foregoing description has been given with respect to a liquid chromatogram of amino acids, it will be appreciated that the method and apparatus of this invention may be utilized with all column chromatography systems, liquid or gas; for example, but not by way of limitation, liquid chromatograms of peptides, gas chromatograms of insecticides, gas chromatograms of hydrocarbons, liquid chromatograms of sugars and gas chromatograms of acetates.

I claim:

1. A method of semi-automatically indicating the respective unknown quantities of a plurality of known constituents in a sample mixture, said method comprising: passing a standard mixture of respective known quantities of said known constituents plus a known quantity of an additional constituent through a chromatographic analysis system to provide a standard curve having a plurality of peaks, the enveloped area of each peak being indicative of said known quantity of a respective one of said known constituents; passing the sample mixture of the respective unknown quantities of said known constituents plus said known quantity of said additional known constituent through said same chromatographic analysis system to provide a sample curve having a plurality of peaks, the enveloped area of each peak being indicative of said unknown quantity of a respective one of said known constituents and said known quantity of said additional known constituent; generating a first voltage which continuously corresponds to the amplitude of said standard curve peak indicative of said known quantity of said known additional constituent and for an interval of time proportional to the width of said peak, thereby effecting an integration of said peak to provide a signal indicative of the area enclosed by said peak; generating a second voltage which continuously corresponds to the amplitude of said sample curve peak indicative of said known quantity of said known additional constituent and for an interval of time proportional to the width of said peak, thereby effecting an integration of said peak to provide a signal indicative of the area enclosed by said peak, the ratio of said integrated areas being the standard area ratio of said sample curve; finding the ratio of each of the enveloped areas indicative of said known constituents to the enveloped area of the peak indicative of said known quantity of said additional constituent on said sample curve, the ratio being the color equivalent of the respective constituent; and generating for respective intervals of time a plurality of third voltages which continuously correspond to the amplitudes of the respective sample curve peaks, said intervals of time being proportional to the widths of the respective sample curve peaks, thereby effecting an integration of each sample curve peak, the respective standard areas and color equivalent ratios being used as multipliers with the respective amplitudes and time intervals so that the resulting signals are measures of the products of the respective integrals of amplitude with respect to time, the respective standard areas and the respective color equivalent ratios, and hence of the quantities of the respective known constituents in the sample mixture.

2. A method according to claim 1 wherein the enveloped area of each standard curve peak is measured by generating a respective additional voltage continuously responsive to the amplitude of said curve peak, and integrating said respective additional voltage with respect to the width of such curve peak.

3. A method according to claim 1 wherein the width of each curve peak is recorded with respect to a constant time rate, and the integration of each curve peak is performed with respect to a constant time rate.

4. Apparatus for semi-automatically indicating the respective unknown quantities of a plurality of known constituents in a sample mixture, wherein a standard mixture of respective known quantities of said known constituents plus a known quantity of an additional known constituent has previously been passed through a chromatographic analysis system to provide a standard curve having a plurality of peaks, the enveloped area of each peak being inddicative of said known quantity of a respective one of said known constituents; and the sample mixture of the respective unknown quantities of said known constituents plus said known quantity of said additional known constituent has been previously passed through said chromatographic analysis system to provide a sample curve having a plurality of peaks, the enveloped area of each peak being indicative of said unknown quantity of a respective one of said known constituents and said known quantity of said additional known constituent; means for generating a first voltage which continuously corresponds to the amplitude of said standard curve peak indicative of said known quantity of said known additional constituent and for an interval of time proportional to the width of said peak, thereby effecting an integration of said peak to provide a signal indicative of the area enclosed by said peak; said means also adapted for generating a second voltage which continuously corresponds to the amplitude of said sample curve peak indicative of said known quantity of said known additional constituent and for an interval of time proportional to the width of said peak, thereby effecting an integration of said peak to provide a signal indicative of the area enclosed by said peak, the ratio of said integrated areas being the standard area ratio of said sample curve; said means also adapted for generating an additional voltage which continuously corresponds to the amplitude of each respective standard curve peak and for an interval time proportional to the width of said peaks, thereby effecting an integration of each of said peaks and providing a signal indicative of the area enveloped by each of said peaks, the ratio of each of the enveloped areas to the enveloped area of the peak indicative of said known quantity of said additional known constituent being the color equivalent of the respective constituent; and said means being also adapted for generating for respective intervals of time a plurality of third voltages which continuously correspond to the amplitudes of the respective sample curve peaks, said intervals of time being proportional to the widths of the respective sample curve peaks, thereby effecting an integration of each sample curve peak; multiplying the respective standard areas and color equivalent ratios with the respective amplitudes and the respective time intervals, so that the resulting signals are indicative of the products of the respective integrals of amplitude with respect to time, the respective standard areas and the respective color equivalent ratios, and, hence, of the quantities of the respective known constituents in the sample mixture; a strip chart on which said curves have been recorded along a lateral axis; and means for advancing said strip chart at a fixed time rate along a longitudinal axis; said generating means comprising a stylus and a slidewire having a movable tap, said stylus being mechanically coupled to the movable tap of said slidewire and guided for movement along said lateral axis to follow each curve peak; a source of electrical potential coupled across said slidewire, whereby said movable tap provides an electrical potential responsive to the excursion of said stylus along said lateral axis; and an electrical potential integrating means coupled to said movable tap for integrating each curve peak.

5. Apparatus according to claim 4 further including:
a first variable resistor coupled in circuit between said source and said slidewire to vary the potential across said slidewire responsive to the color equivalent ratio; and
a second variable resistor coupled in circuit between said source and said slidewire to vary the potential across said slidewire responsive to the standard area ratio.

6. Apparatus according to claim 5 wherein said first source of electrical potential is ungrounded, and said integrating means is grounded, further including
an adjustable grounded second source of electrical potential coupled to said slidewire for varying the potential of said slidewire with respect to ground.

References Cited

UNITED STATES PATENTS

| 3,049,908 | 8/1962 | Kindred et al. | 73—23.1 |
| 3,281,687 | 10/1966 | Boer et al. | 73—23.1 XR |
| 3,307,019 | 2/1967 | Woodward et al. | 235—61.6 |

MAYNARD R. WILBUR, Primary Examiner

L. H. BOUDREAU, Assistant Examiner

U.S. Cl. X.R.

73—23; 235—151.35